US011794710B2

(12) United States Patent
Usui

(10) Patent No.: US 11,794,710 B2
(45) Date of Patent: Oct. 24, 2023

(54) ELECTRIC PARKING BRAKE DEVICE

(71) Applicant: NISSIN KOGYO CO., LTD., Tomi (JP)

(72) Inventor: Koji Usui, Tomi (JP)

(73) Assignee: Hitachi Astemo, Ltd., Ibaraki (JP)

( * ) Notice: Subject to any disclaimer, the term of this patent is extended or adjusted under 35 U.S.C. 154(b) by 599 days.

(21) Appl. No.: 17/043,296

(22) PCT Filed: Dec. 6, 2018

(86) PCT No.: PCT/JP2018/044929
§ 371 (c)(1),
(2) Date: Sep. 29, 2020

(87) PCT Pub. No.: WO2019/187361
PCT Pub. Date: Oct. 3, 2019

(65) Prior Publication Data
US 2021/0016762 A1    Jan. 21, 2021

(30) Foreign Application Priority Data

Mar. 30, 2018   (JP) .................................. 2018-068037

(51) Int. Cl.
*B60T 13/74*   (2006.01)
*F16D 51/22*   (2006.01)
(Continued)

(52) U.S. Cl.
CPC .......... *B60T 13/746* (2013.01); *B60T 13/741* (2013.01); *D07B 1/06* (2013.01); *F16D 51/22* (2013.01);
(Continued)

(58) Field of Classification Search
CPC .......... F16D 51/22; F16D 51/28; F16D 65/22; F16D 2121/24; F16D 2125/40;
(Continued)

(56) References Cited

U.S. PATENT DOCUMENTS

| 6,490,946 B2 | 12/2002 | Ikeda |
| 6,533,082 B2 * | 3/2003 | Gill ......................... B60T 7/108 |
| | | 188/72.8 |

(Continued)

FOREIGN PATENT DOCUMENTS

| CN | 1930404 A | 3/2007 |
| CN | 102628483 A | 8/2012 |

(Continued)

OTHER PUBLICATIONS

Official Communication, extended European search report, dated Nov. 19, 2021, issued over the corresponding EP Patent Application No. 18912782.2.

(Continued)

*Primary Examiner* — Thomas J Williams
(74) *Attorney, Agent, or Firm* — Carrier, Shende & Associates P.C.; Fulchand P. Shende; Joseph P. Carrier

(57) ABSTRACT

In an electric parking brake device configured in such a way that a parking brake state resulting from pulling of a brake cable is released by loosening the brake cable, the brake cable is formed by twisting together a plurality of wires in such a way as to generate a twisting force in a fixed direction when pulled, and the direction in which the twisting force generated by the brake cable in a pulled state acts on a screw shaft is set to be the same direction as the direction in which a nut is rotated to loosen the brake cable. This makes it possible to reduce an operating sound and to reduce wear of members constituting a rotation restricting device.

2 Claims, 10 Drawing Sheets

(51) Int. Cl.
    *F16D 65/22*    (2006.01)
    *D07B 1/06*    (2006.01)
    *F16H 25/20*    (2006.01)
    *B60T 1/06*    (2006.01)
    *F16D 121/24*    (2012.01)
    *F16D 125/40*    (2012.01)
    *F16D 125/58*    (2012.01)
    *F16D 125/60*    (2012.01)

(52) U.S. Cl.
    CPC .............. *F16D 65/22* (2013.01); *F16H 25/20* (2013.01); *B60T 1/067* (2013.01); *F16D 2121/24* (2013.01); *F16D 2125/40* (2013.01); *F16D 2125/582* (2013.01); *F16D 2125/60* (2013.01); *F16H 2025/2031* (2013.01); *F16H 2025/2075* (2013.01); *F16H 2025/2081* (2013.01)

(58) Field of Classification Search
    CPC ........... F16D 2125/60; F16D 2125/582; B60T 1/067; B60T 13/746
    USPC ................... 188/2 D, 78, 325, 330
    See application file for complete search history.

(56) References Cited

U.S. PATENT DOCUMENTS

| | | | | |
|---|---|---|---|---|
| 7,648,006 | B2* | 1/2010 | Deutloff | B60T 7/108 188/72.8 |
| 8,235,181 | B2* | 8/2012 | Sano | F16H 25/2021 188/156 |
| 8,662,263 | B2* | 3/2014 | Deutloff | B60T 13/746 188/162 |
| 9,211,877 | B2* | 12/2015 | Deutloff | F16D 65/28 |
| 9,631,687 | B2 | 4/2017 | Shin | |
| 10,138,966 | B2 | 11/2018 | Usui et al. | |
| 2012/0193178 | A1 | 8/2012 | Yamada et al. | |
| 2021/0016756 | A1* | 1/2021 | Usui | F16D 51/22 |
| 2021/0016762 | A1* | 1/2021 | Usui | B60T 13/741 |

FOREIGN PATENT DOCUMENTS

| | | | | |
|---|---|---|---|---|
| CN | 104912974 A | 9/2015 | | |
| CN | 205086902 U | 3/2016 | | |
| DE | 196 09 629 A1 | 1/1997 | | |
| DE | 10 2006 018 625 A1 | 10/2007 | | |
| JP | 2001-295874 A | 10/2001 | | |
| JP | 2006-050885 A | 2/2006 | | |
| JP | 2017-074809 A | 4/2017 | | |
| JP | 2017-082834 A | 5/2017 | | |
| KR | 20000043948 A | * | 7/2000 | ........... D07B 1/0673 |
| WO | 2015/083802 A1 | 6/2015 | | |

OTHER PUBLICATIONS

Office Action dated Sep. 3, 2021 issued in the corresponding Chinese Patent Application No. 201880092036.3.

* cited by examiner

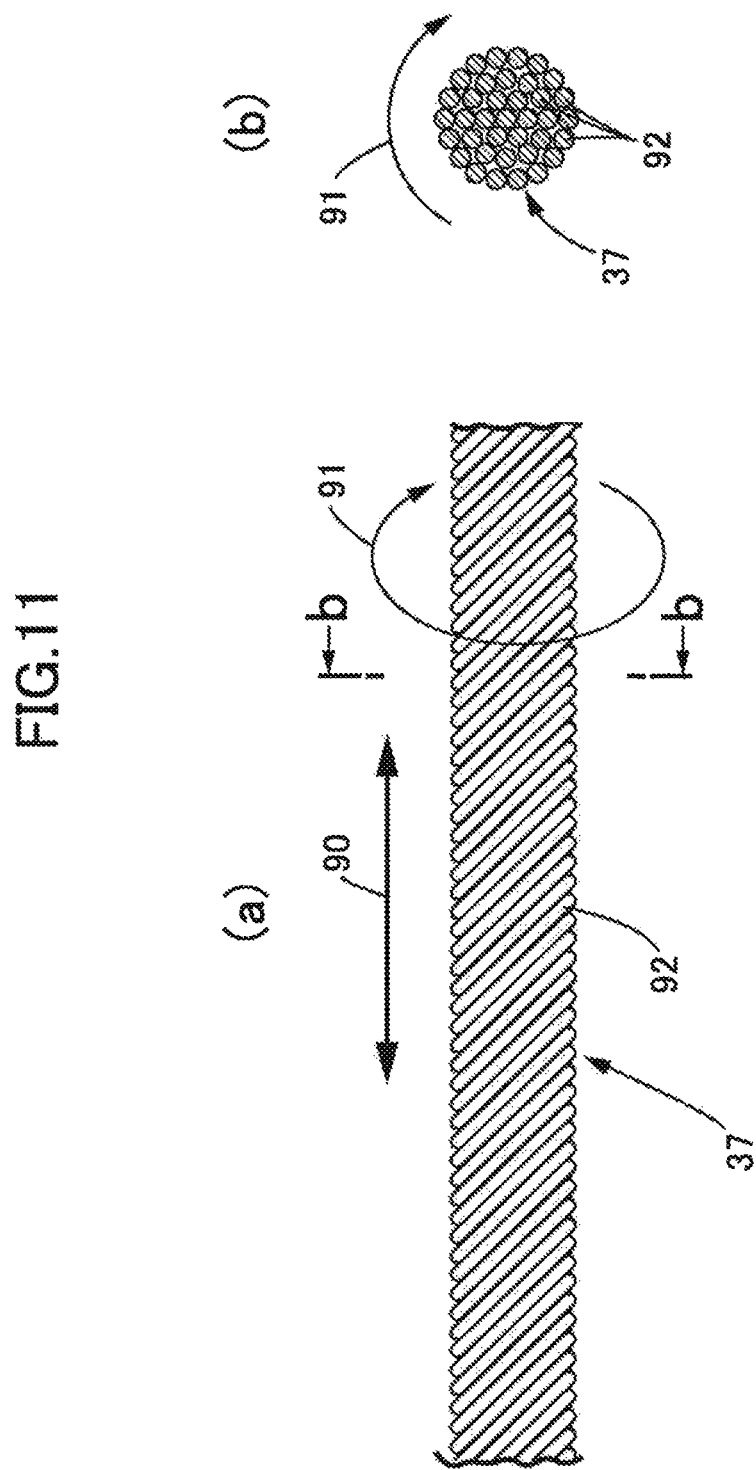

ELECTRIC PARKING BRAKE DEVICE

TECHNICAL FIELD

The present invention relates to an electric parking brake device including a screw shaft that is connected to a brake cable; an actuator case that supports the screw shaft movably in an axial direction thereof; an electric motor that is supported by the actuator case rotatably forward and backward; a motion conversion mechanism that has a nut to be screwed onto the screw shaft, enables conversion from a rotational motion generated in the electric motor to a linear motion of the screw shaft, and is accommodated in the actuator case; and a rotation restricting means that restricts a rotational motion of the screw shaft, in which switching between a parking brake state reached by pulling the brake cable and a non-parking brake state reached by loosening the brake cable is performed by a change in a rotational direction of the electric motor.

BACKGROUND ART

An electric parking brake device that switches between a state in which a parking brake force is obtained by pulling a brake cable and a state in which a parking brake force is released by loosening the brake cable by a change in the rotational direction of an electric motor is known in PTL 1.

CITATION LIST

Patent Literature

PTL 1: JP-A-2017-82834

SUMMARY OF INVENTION

Technical Problem

Although the electric parking brake device disclosed in PTL 1 has a rotation restricting means, configured by a projection portion provided in the screw shaft and a groove formed in the actuator case so as to be entered by the projection portion, for restricting the rotation of the screw shaft, since a clearance is present between the projection portion and the groove, the projection portion collides with the side surface of the groove and causes a slapping sound when the rotational direction of the screw shaft is changed to switch between the parking brake state and the parking brake release state and may cause a large operating sound. In addition, if the projection portion is kept pressed strongly against the side surface of the groove during movement in the axial direction of the screw shaft when a rotational motion is restricted by the rotation restricting means, the sliding resistance of the projection portion becomes large, thereby increasing wear of the projection portion and the actuator case.

The invention addresses the above situation with an object of providing an electric parking brake device that reduces an operating sound during switching between the parking brake state and the parking brake release state and reduces wear of members constituting the rotation restricting means.

Solution to Problem

To achieve the above object, according to a first aspect of the invention, there is provided an electric parking brake device including a screw shaft that is connected to a brake cable; an actuator case that supports the screw shaft movably in an axial direction thereof; an electric motor that is supported by the actuator case rotatably forward and backward; a motion conversion mechanism that has a nut to be screwed onto the screw shaft, enables conversion from a rotational motion generated in the electric motor to a linear motion of the screw shaft, and is accommodated in the actuator case; and a rotation restricting means that restricts a rotational motion of the screw shaft, in which switching between a parking brake state reached by pulling the brake cable and a non-parking brake state reached by loosening the brake cable is performed by a change in a rotational direction of the electric motor, in which the brake cable is formed by twisting a plurality of wires so as to generate a twisting force in a fixed direction when the brake cable is pulled, and a direction in which the twisting force generated by the brake cable in a pulled state acts on the screw shaft is set identical to a rotational direction of the nut when the brake cable is loosened.

According to a second aspect of the invention, in addition to the structure in the first aspect, the rotation restricting means includes a plurality of rotation restricting projection portions that are provided in an end portion of the screw shaft opposite to the brake cable and radially project from the screw shaft and a plurality of rotation restricting grooves formed in the actuator case or an insertion member accommodated and fixed in the actuator case and entered by the rotation restricting projection portions.

Advantageous Effects of Invention

In the first aspect of the invention, since the twisting force for rotationally biasing the screw shaft to the side loosening the brake cable acts on the screw shaft from the brake cable when the brake cable is pulled, it is possible to prevent components constituting the rotation restricting means from strongly colliding with each other during switching from the parking brake state to the parking brake release state, suppress the generation of a slapping sound, and reduce the operating sound. In addition, when the screw shaft is moved in the axial direction to enter the parking brake state by pulling the brake cable, it is possible to prevent components constituting the rotation restricting means from strongly colliding with each other, reduce the driving torque of the electric motor by reducing the sliding resistance, and reduce wear of members constituting the rotation restricting means.

In addition, in the second aspect of the invention, the operating sound can be reduced more effectively by restricting the rotation of the screw shaft at a plurality of positions in the circumferential direction of the screw shaft.

BRIEF DESCRIPTION OF DRAWINGS

FIG. 11 illustrates the generation of a twisting force in the brake cable, FIG. 11(a) is a side view illustrating the brake cable, and FIG. 11(b) is a sectional view taken along line b-b in FIG. 11(a) (first embodiment).

REFERENCE SIGNS LIST

Figure 1:
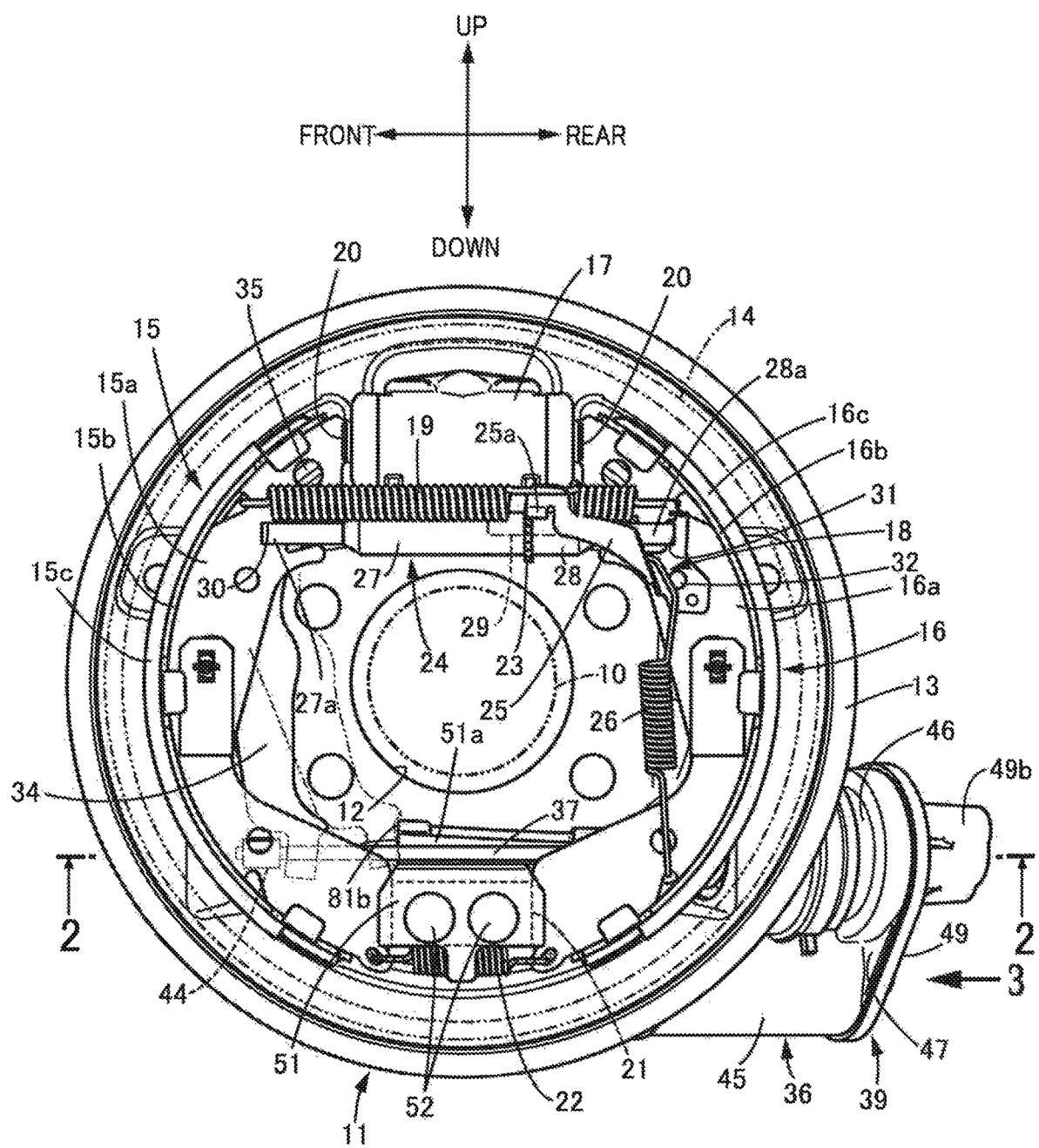
FIG. 1 is a front view illustrating a drum brake device (first embodiment).

37: brake cable
38: screw shaft
39: actuator case
40: electric motor
41: motion conversion mechanism
61: nut
73: rotation restricting means
74: insertion member
75: rotation restricting groove
76b: rotation restricting projection portion
92: wire

DESCRIPTION OF EMBODIMENTS

An embodiment of the invention will be described with reference to attached FIGS. 1 to 11.

First Embodiment

Figure 2:
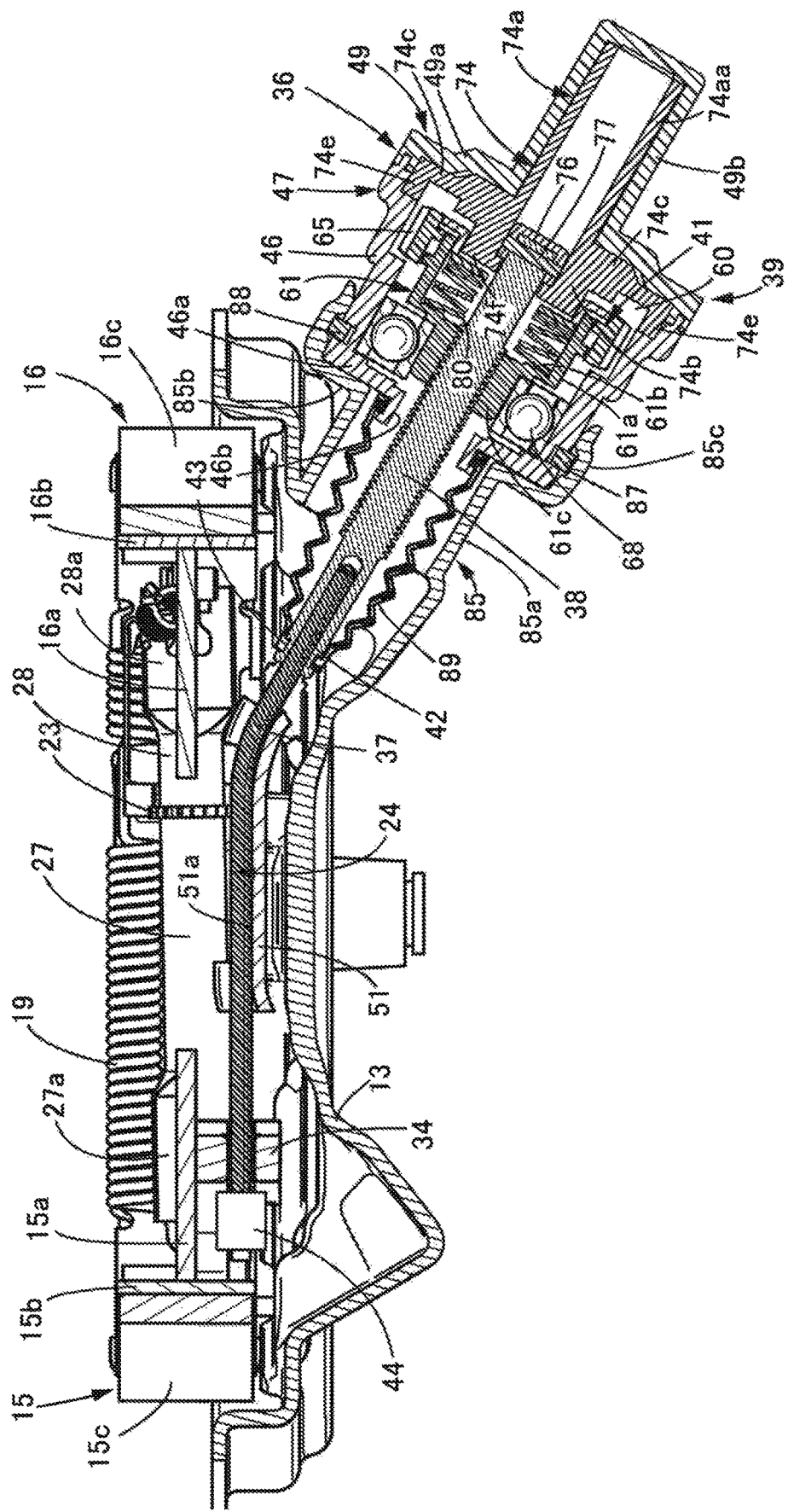
FIG. 2 is a sectional view taken along line 2-2 in FIG. 1 (first embodiment).
Figure 3:
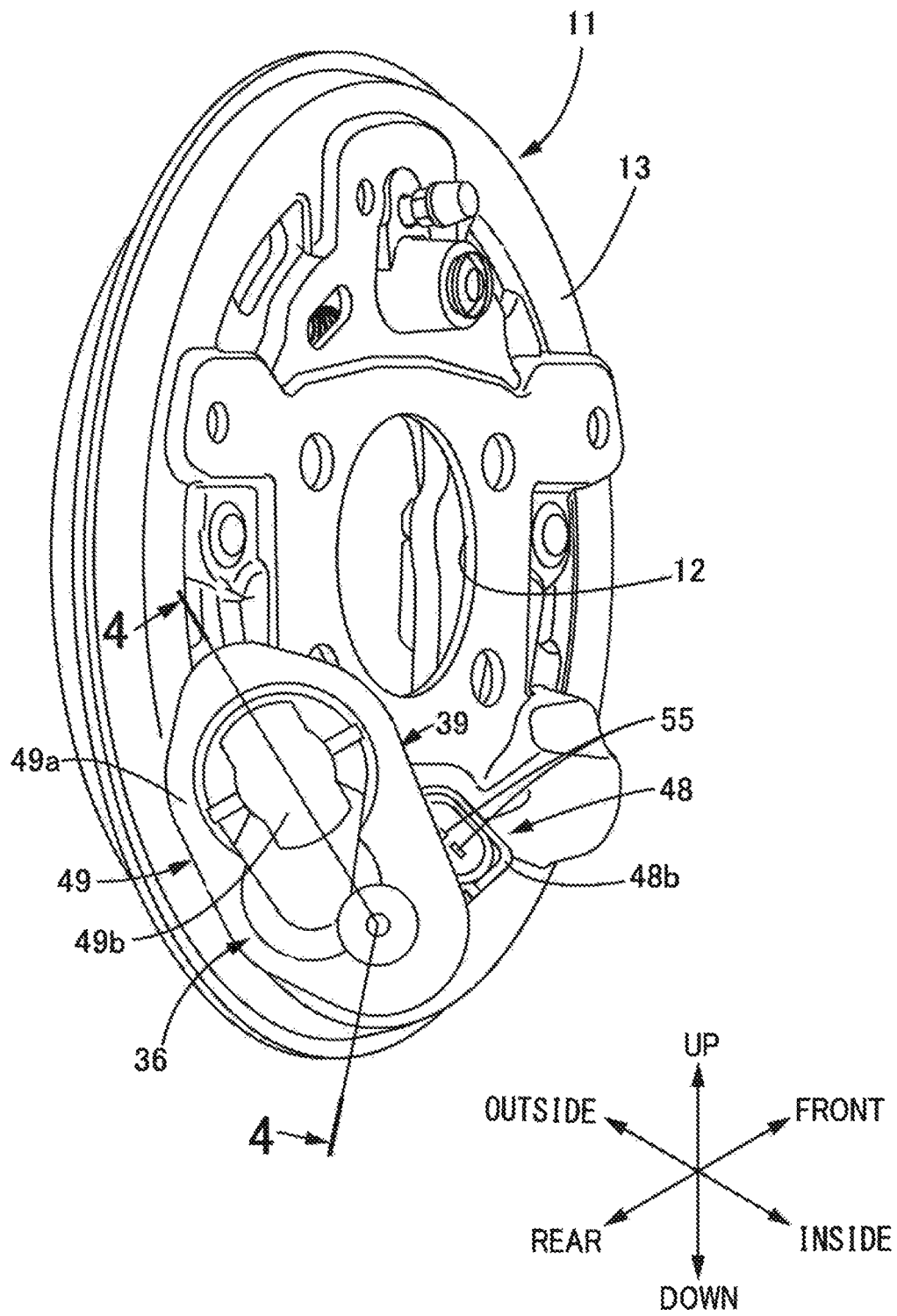
FIG. 3 is a perspective view seen along arrow 3 in FIG. 1 (first embodiment).

In FIGS. 1 to 3, a drum brake device 11 is provided in, for example, the left-rear wheel of a four-wheel vehicle and this drum brake device 11 includes a fixed back plate 13 having, at the center thereof, a through-hole 12 that passes through a wheel shaft 10 of the left rear wheel, first and second brake shoes 15 and 16 disposed in the back plate 13 so as to enable sliding contact with the inner periphery of a brake drum 14 that rotates together with the left rear wheel, a wheel cylinder 17 fixed to an upper portion of the back plate 13 so as to generate a force for operating the first and second brake shoes 15 and 16 in an expanded manner, a braking clearance automatic adjustment means (so-called automatic adjuster) 18 that automatically adjusts the clearance between the first and second brake shoes 15 and 16 and the brake drum 14, and a return spring 19 provided between the first and second brake shoes 15 and 16.

The first and second brake shoes 15 and 16 include webs 15a and 16a formed in bows along the inner periphery of the brake drum 14, rims 15b and 16b provided in a linked manner orthogonally to the outer peripheries of the webs 15a and 16a, and linings 15c and 16c pasted to the outer peripheries of the rims 15b and 16b.

The outer end portions of a pair of pistons 20 of the wheel cylinder 17 are disposed so as to face the webs 15a and 16a in the upper end portions of the first and second brake shoes 15 and 16. In addition, an anchor block 21 that functions as the fulcrum when the first and second brake shoes 15 and 16 are expanded or contracted is provided in a fixed manner in the lower portion of the back plate 13 so as to support one end portions (lower end portions in this embodiment) of the first and second brake shoes 15 and 16, and the wheel cylinder 17 is operated by the output hydraulic pressure of the master cylinder (not illustrated) operated by the brake pedal and generates a force for driving the first and second brake shoes 15 and 16 in an expanded manner using the anchor block 21 as the fulcrum.

A coil spring 22 for biasing the lower end portions of the webs 15a and 16a of the first and second brake shoes 15 and 16 toward the anchor block 21 is provided between the lower end portions of the webs 15a and 16a and the return spring 19 for biasing the first and second brake shoes 15 and 16 in a contraction direction is provided between the upper end portions of the webs 15a and 16a of the first and second brake shoes 15 and 16.

The braking clearance automatic adjustment means 18 includes a contraction position restricting strut 24 that is provided between the webs 15a and 16a of the first and second brake shoes 15 and 16 and stretchable by rotation of an adjustment gear 23, an adjustment lever 25 that has a feeding claw 25a to be engaged with the adjustment gear 23 and is pivotably supported by the web 16a of the second brake shoe 16, which is one of the first and second brake shoes 15 and 16, and an adjustment spring 26 that pivotally biases the adjustment lever 25 to the side rotating the adjustment gear in the direction in which the contraction position restricting strut 24 is stretched.

The contraction position restricting strut 24 restricts the contraction positions of the first and second brake shoes 15 and 16 and includes a first rod 27 that has a first engagement portion 27a to be engaged with an upper portion of the web 15a of the first brake shoe 15 of the first and second brake shoes 15 and 16, a second rod 28 that has a second engagement portion 28a to be engaged with an upper portion of the web 16a of the second brake shoe 16 and is disposed concentrically with the first rod 27, and an adjustment bolt 29 with one end portion inserted into the first rod 27 relatively movably in the axial direction and the other end portion to be screwed concentrically with the second rod 28, in which the adjustment gear 23 is disposed between the first and second rods 27 and 28 and formed in the outer periphery of the adjustment bolt 29.

A first retaining recess 30 with which the first engagement portion 27a is engaged is provided in the upper portion of the web 15a of the first brake shoe 15 and a second retaining recess 31 with which the second engagement portion 28a is engaged is provided in the upper portion of the web 16a of the second brake shoe 16.

The adjustment lever 25 having the feeding claw 25a to be engaged with the adjustment gear 23 is pivotably supported by the web 16a of the second brake shoe 16 via a support shaft 32 and the adjustment spring 26 is provided between the web 16a of the second brake shoe 16 and the adjustment lever 25. Furthermore, the spring force of the adjustment spring 26 is set smaller than the spring force of the return spring 19.

In the braking clearance automatic adjustment means 18 described above, if the first and second brake shoes 15 and 16 are expanded beyond a certain value due to wear of the linings 15c and 16c when the first and second brake shoes 15 and 16 are operated in an expanded manner by the operation of the wheel cylinder 17, the adjustment lever 25 is pivoted about the axial line of the support shaft 32 by the spring force of the adjustment spring 26 and the adjustment gear 23 is thereby rotated, and the effective length of the contraction position restricting strut 24 is corrected to a larger value.

By the way, the drum brake device 11 is provided with a parking brake lever 34 having one end pivotably supported by the web 15a of the first brake shoe 15 of the first and second brake shoes 15 and 16 and engaged with one end portion of the contraction position restricting strut 24.

The parking brake lever 34 extends upward and downward so as to partially overlap with the web 15a of the first brake shoe 15 in front view and the upper end portion of this parking brake lever 34 is connected to the upper portion of the web 15a of the first brake shoe 15 via a pin 35, and the first engagement portion 27a of the contraction position restricting strut 24 is engaged with the upper portion of this parking brake lever 34.

When the parking brake of the vehicle is operated, the parking brake lever 34 is driven pivotally counterclockwise about the pin 35 as the fulcrum and this pivot of the parking brake lever 34 causes a force for pressing the lining 16c of the brake shoe 16 against the inner periphery of the brake drum 14 to act on the second brake shoe 16 via the contraction position restricting strut 24. In addition, when the parking brake lever 34 is continuously driven pivotally counterclockwise in FIG. 1, the parking brake lever 34 is pivoted about the engagement point with respect to the first engagement portion 27a of the contraction position restricting strut 24 as the fulcrum, the first brake shoe 15 is operated in an expanded manner via the pin 35 and the lining 15c of the first brake shoe 15 is pressed against the inner periphery of the brake drum 14. That is, the parking brake lever 34 is operated at an operation position at which the linings 15c and 16c of the first and second brake shoes 15 and 16 are pressed against the inner periphery of the brake drum 14 and the parking brake state is obtained in this state.

When application of a rotational driving force to the parking brake lever 34 is stopped, the parking brake lever 34 is returned to a non-operation position together with the first and second brake shoes 15 and 16 operated in a direction away from the inner periphery of the brake drum 14 by the spring force of the return spring 19 and the parking brake lever 34 is biased toward the non-operation position.

The parking brake lever 34 is pivotally driven by the power generated by an electric actuator 36, the brake cable 37 pulled or loosened by the electric actuator 36 enables the parking brake state to be obtained by pivotally driving the parking brake lever 34 so as to press the contraction position restricting strut 24 against the web 15a of the second brake shoe 15 by pulling the brake cable 37 and enables the parking brake state to be released by loosening the brake cable 37, and the brake cable 37 is connected to a lower portion of the parking brake lever 34.

Figure 4:
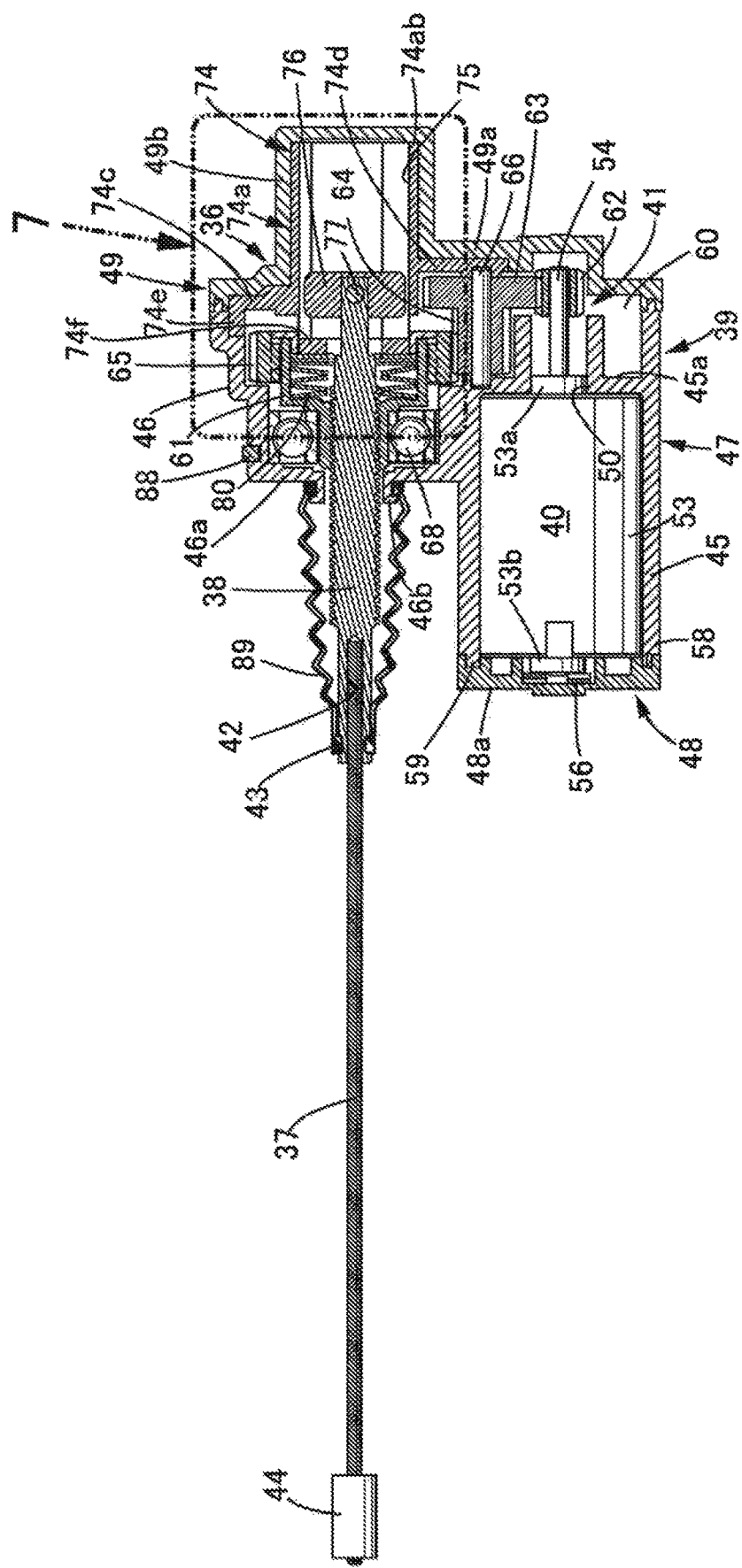
FIG. 4 is a sectional view, taken along line 4-4 in FIG. 3, that illustrates the state in which a brake cable is being loosened (first embodiment).
Figure 5:
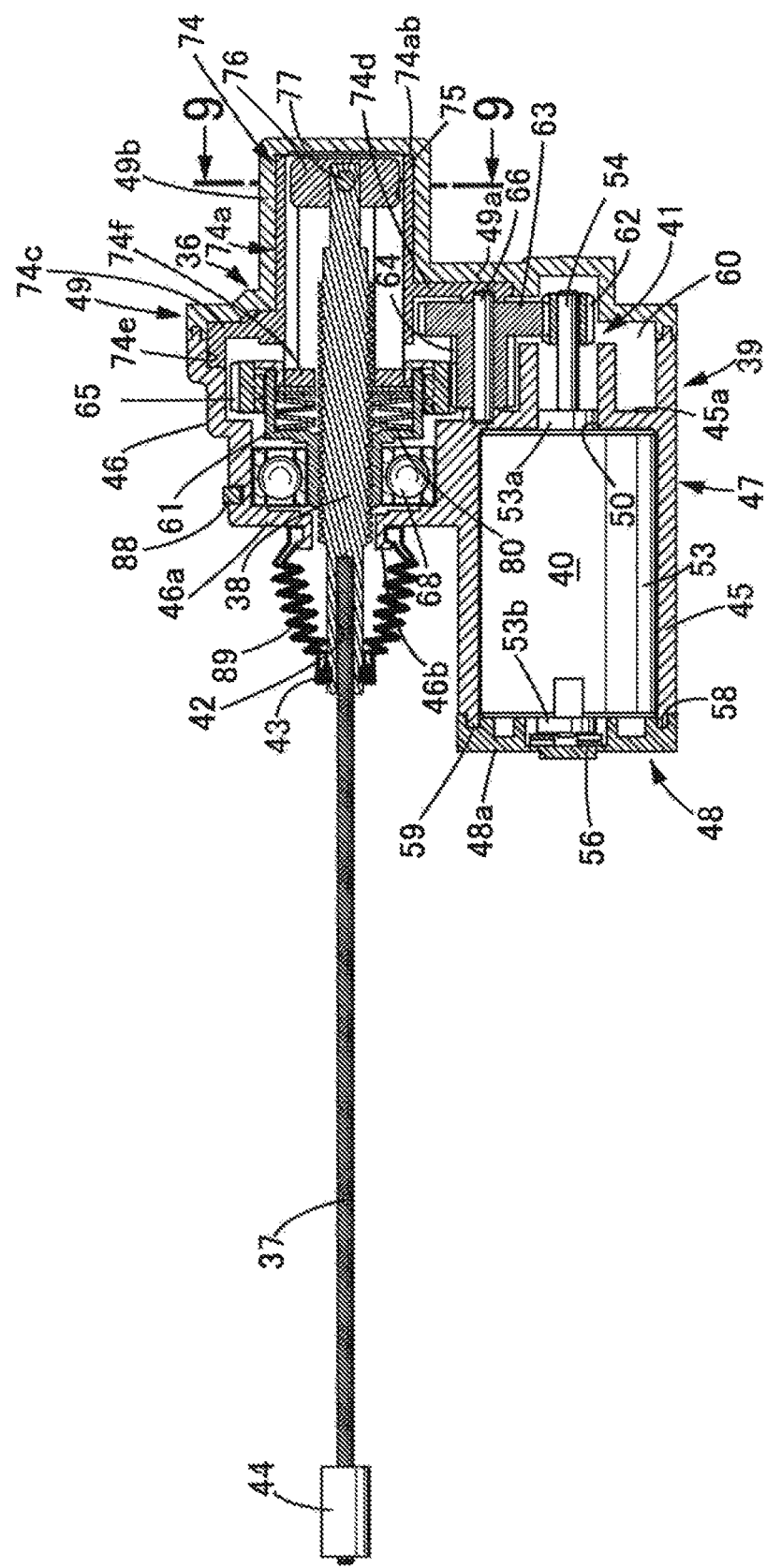
FIG. 5 is a sectional view, corresponding to FIG. 4, that illustrates the state in which the brake cable has been pulled (first embodiment).

Referring to FIGS. 4 and 5 together, the electric actuator 36 includes a screw shaft 38 that is connected to the brake cable 37, an actuator case 39 that supports the screw shaft 38 movably in the axial direction thereof, an electric motor 40 that is supported by the actuator case 39 rotatably forward and backward, and a motion conversion mechanism 41 that enables conversion from a rotational motion generated by the electric motor 40 to a linear motion of the screw shaft 38 and is accommodated in the actuator case 39 while being interposed between the electric motor 40 and the screw shaft 38, in which switching between the parking brake state reached by pulling the brake cable 37 and the parking brake release state reached by loosening the brake cable 37 is performed by a change in the rotational direction of the electric motor 40.

A bottomed joint hole 42 is concentrically provided in the end portion of the screw shaft 38 close to the brake cable 37 and the end portion of the brake cable 37 close to the electric actuator 36 is inserted into the joint hole 42. Furthermore, an annular groove 43 is formed in the outer periphery of the screw shaft 38 close to the opening end of the joint hole 42 and the screw shaft 38 is connected to the brake cable 37 by swaging the annular groove 43 so that a part of the screw shaft 38 digs into the brake cable 37 in the state in which the brake cable 37 is inserted into the joint hole 42.

The brake cable 37 is drawn into the back plate 13 from the electric actuator 36 mounted to the back plate 13 and an engagement piece 44 fixed to the other end portion of this brake cable 37 is engaged with the lower end portion of the parking brake lever 34.

The electric actuator 36 switches between the state in which the screw shaft 38 is moved to the side pulling the brake cable 37 to drive the parking brake lever 34 toward the operation position as illustrated in FIG. 5 and the state in which the screw shaft 38 is moved so as to loosen the brake cable 37 to return the parking brake lever 34 from the operation position toward the non-operation position as illustrated in FIGS. 2 and 4 by a change in the rotational direction of the electric motor 40.

In the lower portion of the back plate 13, a cable guide 51 that sandwiches the anchor block 21 between the cable guide 51 and the lower portion of the back plate 13 is mounted the back plate 13 together with the anchor block 21 via a pair of rivets 52. As clearly illustrated in FIG. 2, this cable guide 51 is provided integrally with a guide portion 51a for guiding the brake cable 37 so as to have a substantially U-shaped cross section.

Figure 6:
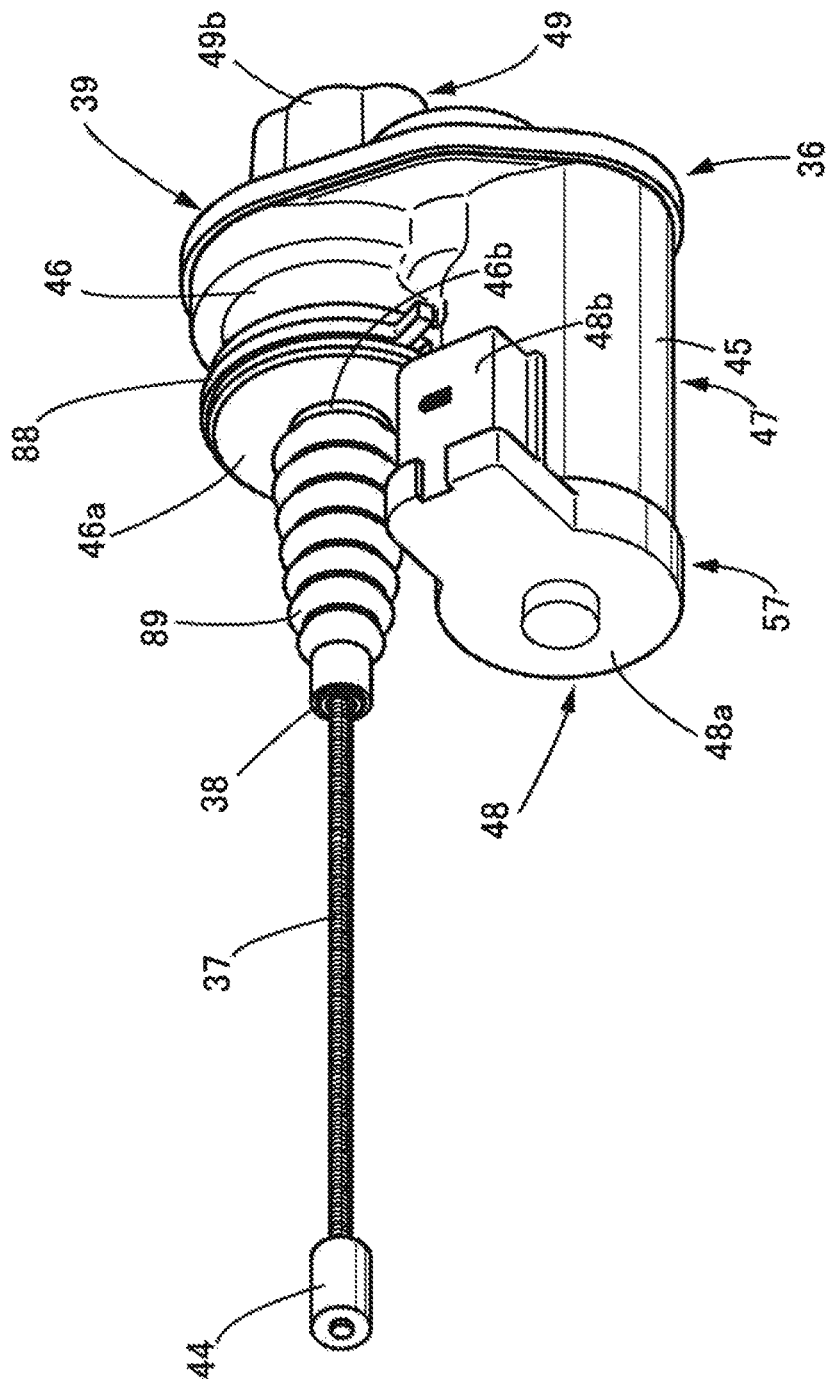
FIG. 6 is a perspective view illustrating an electric actuator (first embodiment).

Referring to FIG. 6 together, the actuator case 39 includes a case main body 47 integrally having first and second accommodating cylindrical portions 45 and 46, a first cover member 48 coupled to the opening end of the first accommodating cylindrical portion 45, and a second cover member 49 coupled to the case main body 47 from the opposite side of the first cover member 48.

The first accommodating cylindrical portion 45 is formed in a bottomed cylinder so as to have a support wall portion 45a on one end side thereof and a fitting hole 50 is concentrically formed at the center of the support wall portion 45a. The second accommodating cylindrical portion 46 is disposed to the side of the first accommodating cylindrical portion 45 and formed in a bottomed cylinder in which one end portion is open and the other end portion is closed by an end wall portion 46a disposed in an intermediate part in the longitudinal direction of the first accommodating cylindrical portion 45, and a cylindrical support cylindrical portion 46b passing through the screw shaft 38 is provided integrally in a projecting manner at the center of the end wall portion 46a.

A cylindrical first bearing portion 53a that rotatably supports a motor shaft 54 is provided in a projecting manner in one end portion in the axial direction of a motor case 53 of the electric motor 40, the one end portion of the motor shaft 54 passes through the first bearing portion 53a and projects from one end portion of the motor case 53, and a bottomed-cylindrical second bearing portion 53b that rotatably supports the other end portion of the motor shaft 54 is provided in a projecting manner in the other end portion in the axial direction of the motor case 53.

This electric motor 40 is accommodated in the first accommodating cylindrical portion 45 so that the one end portion of the motor case 53 abuts against the support wall portion 45a while the first bearing portion 53a is fitted to the fitting hole 50 of the case main body 47, and the electric motor 40 is accommodated in the first accommodating cylindrical portion 45 while a part (the other end portion of the motor case 53 in which the second bearing portion 53b is provided in the embodiment) of the electric motor 40 faces the outside.

The first cover member 48 integrally has a lid portion 48a that covers the part of the electric motor 40 accommodated in the first accommodating cylindrical portion 45 that faces the outside from the first accommodating cylindrical portion 45 and is coupled to the opening end of the first accommodating cylindrical portion 45 and a connector portion 48b that overhands toward the side from the lid portion 48a so that a terminal 55 (see FIG. 3) continuous to the electric motor 40 is provided and is disposed to the side of the first accommodating cylindrical portion 45, and a wave washer 56 is interposed between the second bearing portion 53b and the lid portion 48a of the electric motor 40.

The lid portion 48a is formed in a dish shape opened toward the first accommodating cylindrical portion 45 and an annular recess 58 concentric with the first accommodating cylindrical portion 45 having a circular cross section is formed at the open end of this lid portion 48a. In contrast, an annular fitting projection portion 59 to be fitted to the annular recess 58 is provided in a projecting manner in the opening end portion of the first accommodating cylindrical portion 45. The lid portion 48a and the first accommodating cylindrical portion 45 are bonded to each other in the state in which the fitting projection portion 59 is fitted to the annular recess 58. This enables the relative position in the circumferential direction of the connector portion 48b with respect to the first accommodating cylindrical portion 45 to be selected at a plurality of positions about the axial line of the first accommodating cylindrical portion 45, increases the freedom of the position of the connector portion 48b with respect to the actuator case 39, and facilitates changes in the orientation of the connector portion 48b.

The second cover member 49 is coupled to the case main body 47 via bonding or welding so as to form a gear chamber 60 between the second cover member 49 and the case main body 47. In addition, the motion conversion mechanism 41 has a nut 61 to be screwed onto the screw shaft 38 as one component and is accommodated in the gear chamber 60.

The motion conversion mechanism 41 includes a driving gear 62 provided in the motor shaft 54 of the electric motor 40, an intermediate large-diameter gear 63 to be meshed with the driving gear 62, an intermediate small-diameter gear 64 that rotates together with the intermediate large-diameter gear 63, a driven gear 65 that is meshed with this intermediate small-diameter gear, and the nut 61 to be connected to this driven gear 65 that enables the relative movement in the axial direction of the driven gear 65 and disables the relative rotation about the axial line, and the nut 61 is screwed onto the screw shaft 38. In addition, the intermediate large-diameter gear 63 and the intermediate small-diameter gear 64 are formed integrally with each other and are rotatably supported by a support shaft 66 arranged in parallel with the motor shaft 54 and the screw shaft 38.

Figure 7:
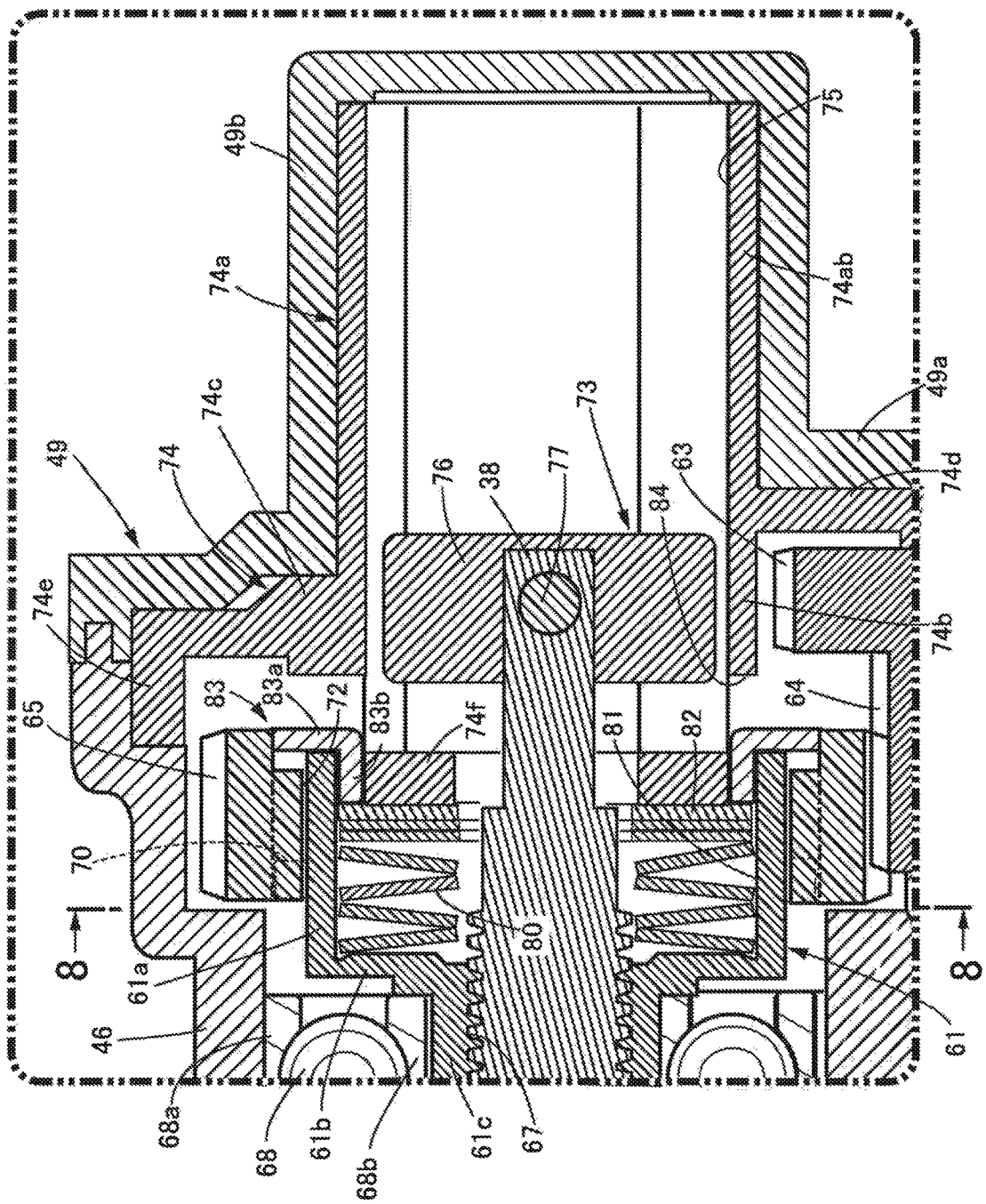
FIG. 7 is an enlarged view illustrating the portion indicated by arrow 7 in FIG. 4 (first embodiment).

Referring to FIG. 7 together, the nut 61 is formed to include a large-diameter cylindrical portion 61a rotatably accommodated in the second accommodating cylindrical portion 46, an inward collar portion 61b that overhangs radially inward from the end portion of the large-diameter cylindrical portion 61a on the opposite side of the second cover member 49, and a small-diameter cylindrical portion 61c that is continuous to the inner peripheral edge of this inward collar portion 61b, extends toward the opposite side of the second cover member 49, and passes through the screw shaft 38.

Female threads 67 to be screwed onto the screw shaft 38 are engraved in the inner periphery of the small-diameter cylindrical portion 61c. In addition, a ball bearing 68 is interposed between the small-diameter cylindrical portion 61c and the end portion of the second accommodating cylindrical portion 46 close to the end wall portion 46a. An outer race 68a of this ball bearing 68 is press-fitted to the second accommodating cylindrical portion 46 and the small-diameter cylindrical portion 61c of the nut 61 is inserted into an inner race 68b of the ball bearing 68 movably in the axial direction.

Figure 8:
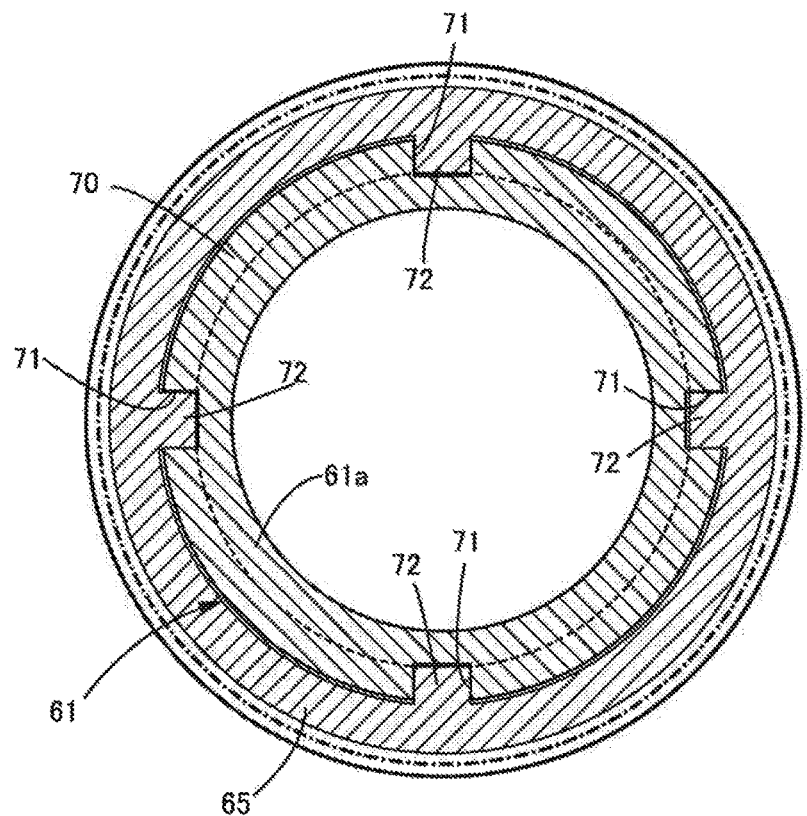
FIG. 8 is a sectional view taken along line 8-8 in FIG. 7 (first embodiment).

Referring to FIG. 8 together, an annular projection portion 70 projecting radially outward is provided integrally in a projecting manner in the intermediate portion in the longitudinal direction of the outer periphery of the large-diameter cylindrical portion 61a, and slits 71 extending in the axial direction are formed so as to cut the annular projection portion 70 at a plurality of positions (for example, four positions) spaced in the circumferential direction of this annular projection portion 70. On the other hand, guide projection portions 72 extending long in the axial direction are provided integrally in a projecting manner so as to project radially inward at a plurality of positions corresponding to the slits 71 in the inner periphery of the driven gear 65 and the guide projection portions 72 are slidably fitted to the slits 71. That is, the driven gear 65 is fitted onto the outer periphery of the large-diameter cylindrical portion 61a of the nut 61 while enabling relative movement in the axial direction and disabling relative rotation about the axial line.

Figure 9:
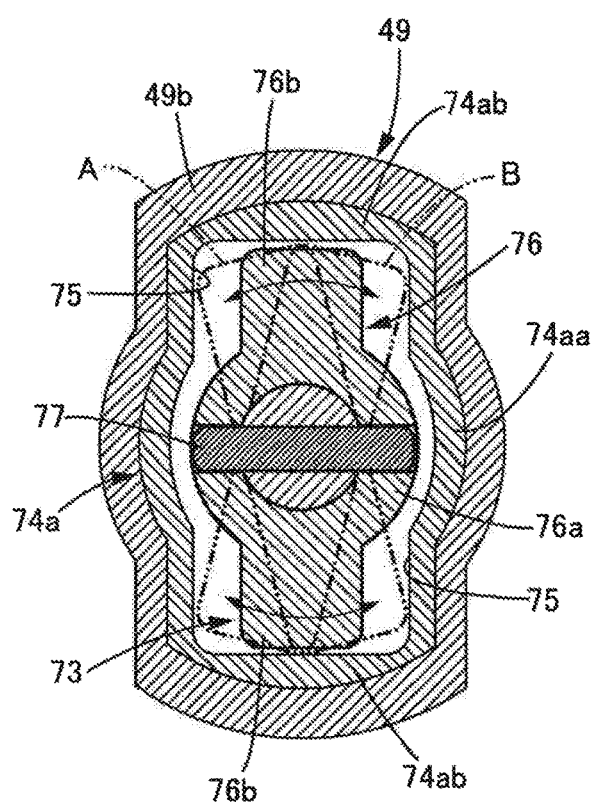
FIG. 9 is a sectional view taken along line 9-9 in FIG. 5 (first embodiment).
Figure 10:
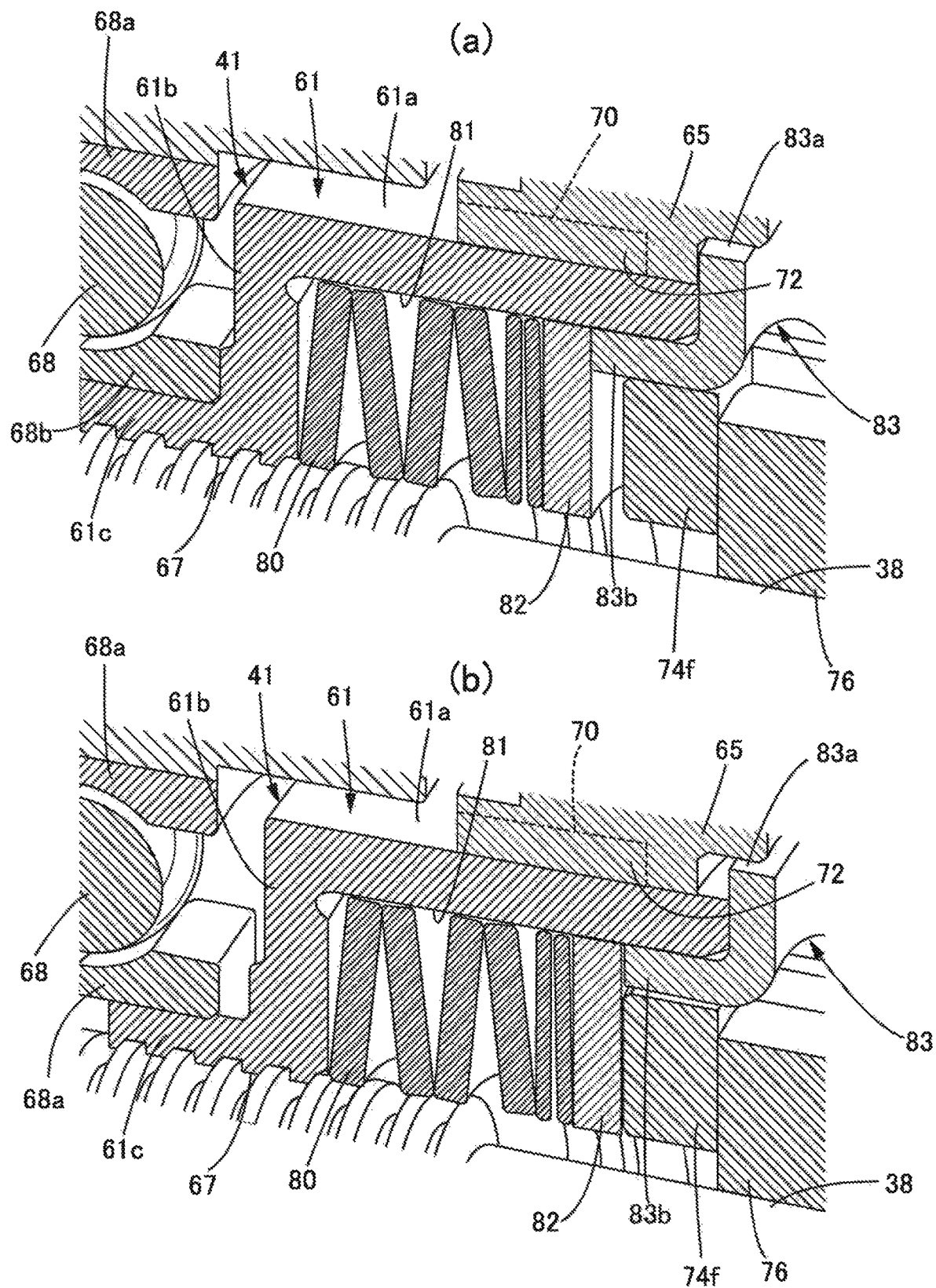
FIGS. 10(a) and 10(b) are main part vertical perspective views illustrating the state in which movement of a screw shaft is restricted by a movement restricting portion when a nut is rotated to the side loosening the brake cable and the state after that, respectively (first embodiment).

Referring to FIG. 9 together, the second cover member 49 of the actuator case 39 is formed by integrally providing, in a linked manner, a cover plate portion 49a coupled to the case main body 47 so as to cover the gear chamber 60 and a bottomed cylindrical portion 49b projecting from the cover plate portion 49a so as to surround the screw shaft 38 and a guide cylindrical portion 74a integrally owned by an insertion member 74 accommodated and fixed in the actuator case 39 is fitted to the cylindrical portion 49b.

The guide cylindrical portion 74a is formed to include a cylindrical part 74a a and a plurality of overhang parts 74a b overhanging radially from the cylindrical part 74a a and the pair of overhang parts 74a b is disposed in one diameter line of the cylindrical part 74a a in the embodiment. In addition, the overhang part 74a b forms rotation restricting grooves 75 extending along the axial line of the cylindrical part 74a a. The cylindrical portion 49b of this second cover member 49 is formed to have an inner surface shape corresponding to the outer surface shape of the guide cylindrical portion 74a.

The insertion member 74 is integrally provided with an extended cylindrical portion 74b that is continuous to the guide cylindrical portion 74a and enters the gear chamber 60, a plurality of (for example, two) mount arm portions 74c that overhang outward to the side from the end portion of the guide cylindrical portion 74a close to the gear chamber 60 along the inner surface of the cover plate portion 49a of the second cover member 49, and one support arm portion 74d that overhands outward to the side from the end portion of the guide cylindrical portion 74a close to the gear chamber 60 along the inner surface of the cover plate portion 49a.

In addition, a positioning projection portion 74e projecting toward the second accommodating cylindrical portion 46 is provided integrally in a projecting manner in a front end portion of the mount arm portion 74c and the insertion member 74 is accommodated and fixed in the actuator case 39 by sandwiching the front end portion of the mount arm portion 74c and the positioning projection portion 74e between the second accommodating cylindrical portion 46 and the cover plate portion 49a of the second cover member 49.

In addition, both end portions of the support shaft 66 for rotatably supporting the intermediate large-diameter gear 63 and the intermediate small-diameter gear 64 are supported between the front end portion of the support arm portion 74d and the support wall portion 45a of the first accommodating cylindrical portion 45.

Focusing on FIG. 9, a rotation restricting means 73 for restricting the rotation of the screw shaft 38 is provided between the guide cylindrical portion 74a of the insertion member 74 and the screw shaft 38 and this rotation restricting means 73 includes a plurality of (two in the embodiment) rotation restricting projection portions 76b that are provided in the end portion of the screw shaft 38 on the opposite side of the brake cable 37 and radially project from the screw shaft 38 and the plurality of (two in the embodiment) rotation restricting grooves 75 that are formed in the guide cylindrical portion 74a so as to be entered by the rotation restricting projection portions 76b.

A cap 76 is put on the end portion of the screw shaft 38 on the opposite side of the brake cable 37. This cap 76 is formed by integrally providing a bottomed cylindrical portion 76a to which the end portion of the screw shaft 38 is fitted and the plurality of the rotation restricting projection portions 76b radially projecting from the bottomed cylindrical portion 76a so as to be inserted into the rotation restricting grooves 75 of the guide cylindrical portion 74a of the insertion member 74 and, in the embodiment, the pair of rotation restricting projection portions 76b projects radially outward from the bottomed cylindrical portion 76a along the one diameter line of the bottomed cylindrical portion 76a. In addition, the cap 76 is fixed to the screw shaft 38 via a pin 77 that passes through the screw shaft 38 and the bottomed cylindrical portion 76a along the one diameter line. This provides the pair of rotation restricting projection portions 76b in the end portion of the screw shaft 38 on the opposite side of the brake cable 37, causes the rotation restricting projection portions 76b to enter the rotation restricting grooves 75 of the insertion member 74 accommodated and fixed in the actuator case 39, and makes the screw shaft 38 movable in a direction along the axial line while being prevented from rotating about the axial line.

By the way, when the brake cable 37 is pulled to drive the parking brake lever 34 toward the operation position, the screw shaft 38 moves so as to cause the cap 76 to separate from the nut 61 as illustrated in FIG. 5. When the brake cable 37 is loosened to return the parking brake lever 34 from the operation position toward the non-operation position, the screw shaft 38 moves so as to cause the cap 76 to come close to the nut 61 as illustrated in FIG. 4. The movement end of the screw shaft 38 in movement in the direction loosening the brake cable 37 is restricted by causing the cap 76 to abut against a movement restricting portion 74f accommodated and fixed in the actuator case 39 and, in the embodiment, the movement restricting portion 74f is integrally provided at the front end of the extended cylindrical portion 74b of the insertion member 74. That is, the movement restricting portion 74f is integrally provided in the front end portion of the extended cylindrical portion 74b so as to overhang radially inward from the front end portion of the extended cylindrical portion 74b.

By the way, in the state in which the cap 76 abuts against the movement restricting portion 74f as illustrated in FIG. 10(a) and then the electric motor 40 continues the operation when the screw shaft 38 moves in the direction loosening the brake cable 37, the nut 61 that rotates relative to the screw shaft 38 that has stopped movement in the axial direction moves in the axial direction so as to increase the interval from the ball bearing 68 as illustrated in FIG. 10(b) and a plurality of disc springs 80 as resilient members compressed in response to the movement in the axial direction of the nut 61 is disposed between the nut 61 and the insertion member 74.

The nut 61 is provided with a recess 81 defined by the large-diameter cylindrical portion 61a and the inward collar portion 61b of the nut 61 so that the recess 81 is opened toward the insertion member 74, and the disc springs 80 are accommodated in the recess 81.

The plurality of disc springs 80 and a disc-shaped retainer 82 that sandwiches these disc springs 80 between the disc-shaped retainer 82 and the inward collar portion 61b of the nut 61 are accommodated in the recess 81. The nut 61 is provided with a holding member 83 for preventing the disc springs 80 and the retainer 82 from being removed from the recess 81 on the opening end side of the recess 80, this holding member 83 is formed to integrally have a ring plate portion 83a that abuts against the end portion of the large-diameter cylindrical portion 61a of the nut 61 close to the insertion member 74 and a short cylindrical portion 83b that is continuous to the inner periphery of this ring plate portion 83a and press-fitted to the large-diameter cylindrical portion 61a of the nut 61, the inner diameter of the short cylindrical portion 83b is set larger than the outer diameter of the movement restricting portion 74f, and the side wall of the extended cylindrical portion 74b of the insertion member 74 is provided with a notch portion 84 formed by cutting a part of the side wall of the extended cylindrical portion 74b to allow the holding member 83 to move.

When the brake cable 37 is pulled as illustrated in FIG. 5 to drive the parking brake lever 34 from the non-operation position toward the operation position, the disc springs 80 are prevented from being removed from the recess 81 because the outer peripheral portion of the retainer 82 makes contact with the short cylindrical portion 83b of the holding member 83. In addition, when the screw shaft 38 moves so as to loosen the brake cable 37, the cap 76 abuts against the movement restricting portion 74f as illustrated in FIG. 10(a), and then the electric motor 40 continues the operation, the nut 61 that rotates relative to the screw shaft 38 that stops movement in the axial direction moves in the axial direction so as to increase the interval from the ball bearing 68 as illustrated in FIG. 10(b), the retainer 82 abuts against the movement restricting portion 74f of the insertion member 74 in response to the movement in the axial direction of the nut 61, the disc springs 80 are compressed between the nut 61 and the movement restricting portion 74f, thereby enabling an increase in the load on the electric motor 40.

A mount cylindrical portion 85 extending backward and inward in the vehicle width direction is provided integrally in a projecting manner on the back plate 13 of the drum brake device 11. This mount cylindrical portion 85 is provided with a large-diameter cylindrical portion 85a with one end that is open backward and inward in the vehicle width direction and a small-diameter cylindrical portion 85c that is concentrically continuous to the large-diameter cylindrical portion 85a with a step portion 85b provided between the small-diameter cylindrical portion 85c and the other end of the large-diameter cylindrical portion 85a. In addition, the actuator case 39 is mounted to the mount cylindrical portion 85 by inserting the second accommodating cylindrical portion 46 of the first cover member 48 in the actuator case 39 of the electric actuator 36 into the large-diameter cylindrical portion 85a and engaging a C-shaped locking ring 88 mounted to the outer periphery of the second accommodating cylindrical portion 46 with a locking groove 87 formed in the inner periphery of the large-diameter cylindrical portion 85a.

When the actuator case 39 is mounted to the mount cylindrical portion 85 of the back plate 13 as described above, the actuator case 39 is mounted to the rear side in the front-rear direction of the vehicle of the back plate 13 and the connector portion 48b is oriented to the rear side in the front-rear direction of the vehicle. In addition, a bellows boot 89 for covering a projection portion of the screw shaft 38 from the second accommodating cylindrical portion 46 is provided between the outer periphery of the support cylindrical portion 46b of the second accommodating cylindrical portion 46 and the outer periphery of one end portion of the screw shaft 38.

The brake cable 37 is a bunch of a plurality of twisted wires 92 and generates a twisting force in the direction indicated by arrow 91 in FIGS. 11(a) and 11(b) when pulled in the direction indicated by arrow 90 in FIG. 11(a) to obtain the parking brake state. A setting is made so that the direction in which the twisting force in this case acts on the screw shaft 38 is the same as the rotational direction of the nut 61 when the electric motor 40 operates in the direction loosening the brake cable 37 for switching from the parking brake state to the parking brake release state.

Next, the operation of the embodiment will be described. The nut 61 of the motion conversion mechanism 41 capable of converting a rotational motion generated by the electric motor 40 to a linear motion of the screw shaft 38 connected to the brake cable 37 is screwed onto the screw shaft 38 movably in the axial direction within a restricted range in a direction along the axial line of the screw shaft 38, the movement restricting portion 74f that restricts the movement end in the axial direction of the screw shaft 38 in movement to the side loosening the brake cable 37 to reach the parking brake release state is provided in a fixed position in the actuator case 39, and the disc springs 80, which are resilient members, are interposed between the nut 61 and the insertion member 74 accommodated and fixed in the actuator case 39 so as to be compressed in response to movement of the nut 61 in the axial direction after the cap 76 fixed to the screw shaft 38 abuts against the movement restricting portion 74f when the screw shaft 38 moves in the axial direction to the side loosening the brake cable 37, so the load on the electric motor 40 can be increased by compression of the disc springs 80. Accordingly, the electric motor 40 can be controlled appropriately and the members constituting the motion conversion mechanism 41 can be prevented from shifting to a lock state. Furthermore, since the nut 61 is relatively movable in the axial direction with respect to the screw shaft 38, generation of an operating sound in parking brake release operation can be prevented. In addition, since the disc springs 80 are provided between the insertion member 74 accommodated and fixed in the actuator case 39 and the nut 61, the strength of the actuator case 39 does not need to be increased more than necessity.

In addition, since the movement restricting portion 74f is provided integrally with the insertion member 74 so that the disc springs 80 are present between the movement restricting portion 74f and the nut 61, the internal structure of the actuator case 39 can be simplified while suppressing an increase in the number of components by providing the disc springs 80 between the nut 61 and the movement restricting portion 74f provided integrally with the insertion member 74.

Furthermore, since the resilient members are the disc springs 80, the space that needs to be reserved in the actuator case 39 to dispose the disc springs 80 can be reduced and the actuator case 39 can be small-sized.

In addition, since the brake cable 37 is formed by twisting the plurality of wires 92 so as to generate a twisting force when pulled and the direction in which the twisting force acts on the screw shaft 38 is the same as the rotational direction of the nut 61 when the brake cable 37 is loosened, even if the nut 61 is rotated so as to obtain the parking brake state, the screw shaft 38 is rotated and reaches a rotary position A indicated by the dotted line in FIG. 9 due to the rotation of the nut 61, and the rotation restricting projection portions 76b abut against the side surface of the rotation restricting grooves 75, the twisting force generated in the brake cable 37 acts on the screw shaft 38 in the direction in which the rotation restricting projection portions 76b moves away from the side surface of the rotation restricting grooves 75. Accordingly, when the screw shaft 38 is moved in the axial direction to shift to the parking brake state by pulling the brake cable 37, it is possible to prevent the components (that is, the guide cylindrical portion 74a of the insertion member 74 and the rotation restricting projection portions 76b of the cap 76) constituting the rotation restricting means 73 from making strong contact with each other, reduce the driving torque of the electric motor 40 by reducing the sliding resistance, and reduce wear of the guide cylindrical portion 74a and the cap 76.

In addition, the rotation restricting projection portions 76b are returned to the vicinity of a rotary position B indicated by the dotted line in FIG. 9 by the twisting force from the brake cable 37 when the parking brake state is maintained. Even when the rotation restricting projection portions 76b of the cap 76 reach the rotary position B by the backward rotation of the nut 61 during switching from the parking brake state to the parking brake release state and make contact with the side surface of the rotation restricting grooves 75 of the insertion member 74, it is possible to prevent the cap 76 and the insertion member 74 from strongly colliding with each other, suppress the generation of a slapping sound, and reduce the operating sound.

In addition, since the rotation restricting means 73 includes the plurality of rotation restricting projection portions 76b that are provided in the end portion of the screw shaft 38 opposite to the brake cable 37 and radially project from the screw shaft 38 and the plurality of the rotation restricting grooves 75 formed in the insertion member 74 so as to be entered by the rotation restricting projection portions 76b, the operating sound can be reduced more effectively by restricting the rotation of the screw shaft 38 at a plurality of positions in the circumferential direction of the screw shaft 38.

Although an embodiment of the invention has been described above, the invention is not limited to the above embodiment and various design changes can be made without departing from the spirit of the invention.

For example, the insertion member does not need to be accommodated and fixed in the actuator case and the rotation restricting grooves may be formed in the actuator case.

The invention claimed is:
1. An electric parking brake device comprising:
a screw shaft that is connected to a brake cable;
an actuator case that supports the screw shaft movably in an axial direction thereof;
an electric motor that is supported by the actuator case rotatably forward and backward;

a motion conversion mechanism that has a nut to be screwed onto the screw shaft, enables conversion from a rotational motion generated in the electric motor to a linear motion of the screw shaft, and is accommodated in the actuator case; and a rotation restricting device that restricts a rotational motion of the screw shaft, wherein switching between a parking brake state reached by pulling the brake cable and a non-parking brake state reached by loosening the brake cable is performed by a change in a rotational direction of the electric motor, wherein the brake cable is formed by twisting a plurality of wires so as to generate a twisting force in a fixed direction when the brake cable is pulled, and a direction in which the twisting force generated by the brake cable in a pulled state acts on the screw shaft is set identical to a rotational direction of the nut when the brake cable is loosened.

2. The electric parking brake device according to claim 1, wherein the rotation restricting device includes a plurality of rotation restricting projection portions that are provided in an end portion of the screw shaft opposite to the brake cable and radially project from the screw shaft, and a plurality of rotation restricting grooves that is formed in the actuator case or an insertion member accommodated and fixed in the actuator case and entered by the rotation restricting projection portions.

* * * * *